(12) United States Patent
Wada et al.

(10) Patent No.: US 7,394,966 B1
(45) Date of Patent: Jul. 1, 2008

(54) IMAGE COMMUNICATION APPARATUS FOR WIRELESS COMMUNICATION OF DIGITAL IMAGES, AND METHOD THEREOF

(75) Inventors: Hidetoshi Wada, Yokohama (JP); Teruo Hieda, Yokohama (JP); Norihiro Kawahara, Kawasaki (JP); Yoshikatsu Nakayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,653

(22) Filed: Jan. 10, 2000

(30) Foreign Application Priority Data

Jan. 11, 1999 (JP) ................................. 11-004070
Jan. 7, 2000 (JP) ............................. 2000-001787

(51) Int. Cl.
*H04N 5/93* (2006.01)
*H04N 5/228* (2006.01)
*H04N 5/262* (2006.01)

(52) U.S. Cl. ............................... 386/46; 386/1; 386/95; 386/96; 386/125; 386/126; 375/240.21; 348/222.1; 348/239

(58) Field of Classification Search ................ 348/239, 348/143, 222, 164, 232; 386/348, 46, 95, 386/8, 117, 121, 48, 96, 1, 125, 126, 110; 375/240.21

See application file for complete search history.

(56) References Cited

U.S. PATENT DOCUMENTS

| | | | | |
|---|---|---|---|---|
| 5,606,365 A | * | 2/1997 | Maurinus et al. | 348/222.1 |
| 5,806,005 A | * | 9/1998 | Hull et al. | 455/566 |
| 5,842,131 A | * | 11/1998 | Yamane | 455/456.1 |
| 6,038,257 A | * | 3/2000 | Brusewitz et al. | 375/240.21 |
| 6,038,295 A | * | 3/2000 | Mattes | 379/93.25 |
| 6,262,767 B1 | * | 7/2001 | Wakui | 348/211.99 |
| 6,396,537 B1 | * | 5/2002 | Squilla et al. | 348/239 |

* cited by examiner

*Primary Examiner*—John Miller
*Assistant Examiner*—Jamie J Vent
(74) *Attorney, Agent, or Firm*—Fitzpatrick, Cella, Harper & Scinto

(57) ABSTRACT

An image capture apparatus includes an image capture unit, a recording unit, a wireless communication unit and a control unit. The recording unit records digital image captured by the image capture unit on a recording medium. The wireless communication unit transmits the digital image recorded on the recording medium to an external recording apparatus. The control unit determines, using additional information corresponding to the digital image recorded on the recording medium, whether or not the digital image recorded on the recording medium is already transmitted to the external recording apparatus. The additional information is received from the external recording apparatus. The control unit controls the wireless communication unit to transmit the digital image recorded on the recording medium to the external recording apparatus if the control unit determines that the digital image recorded on the recording medium is not already transmitted to the external recording apparatus.

12 Claims, 10 Drawing Sheets

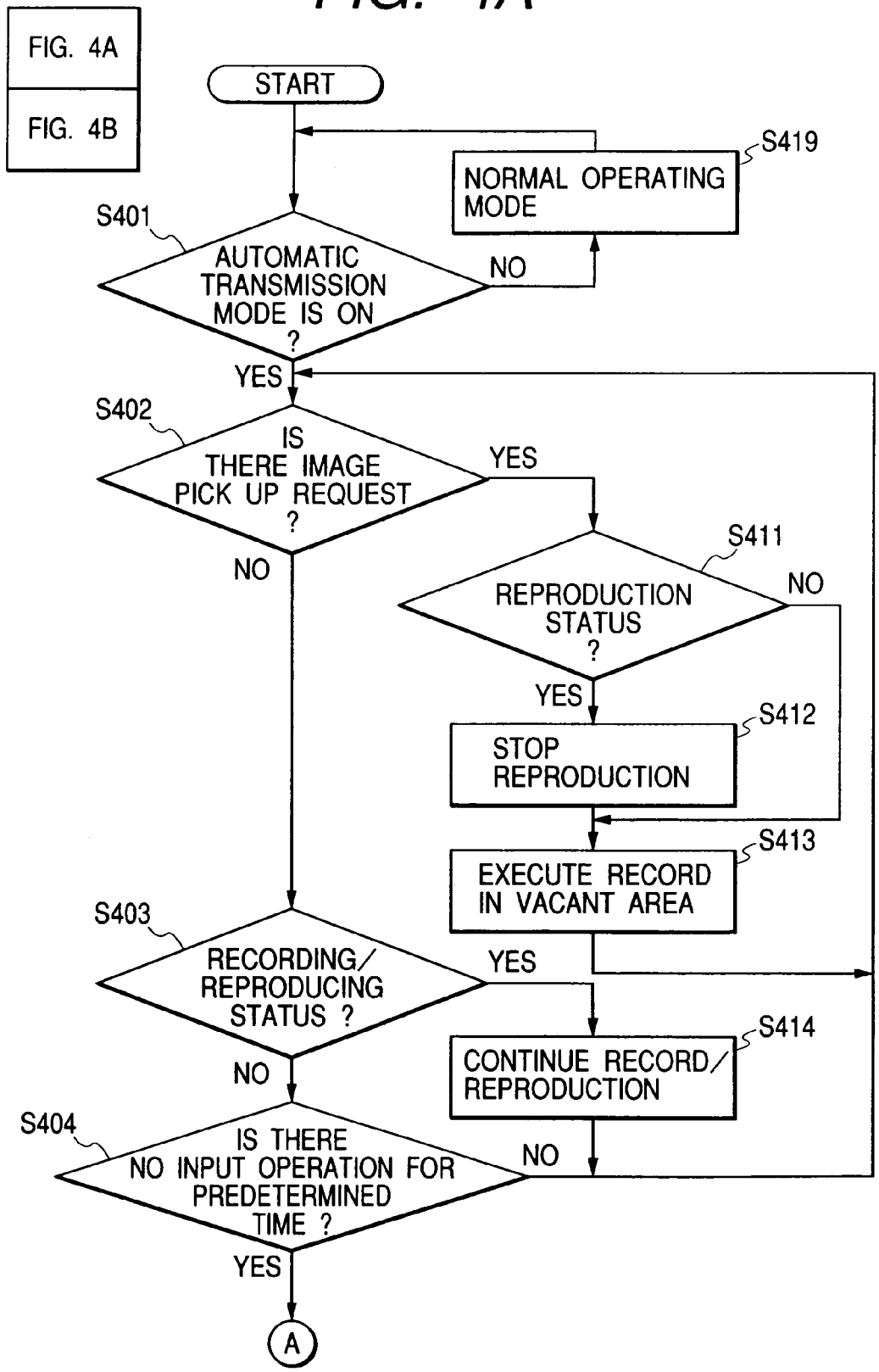

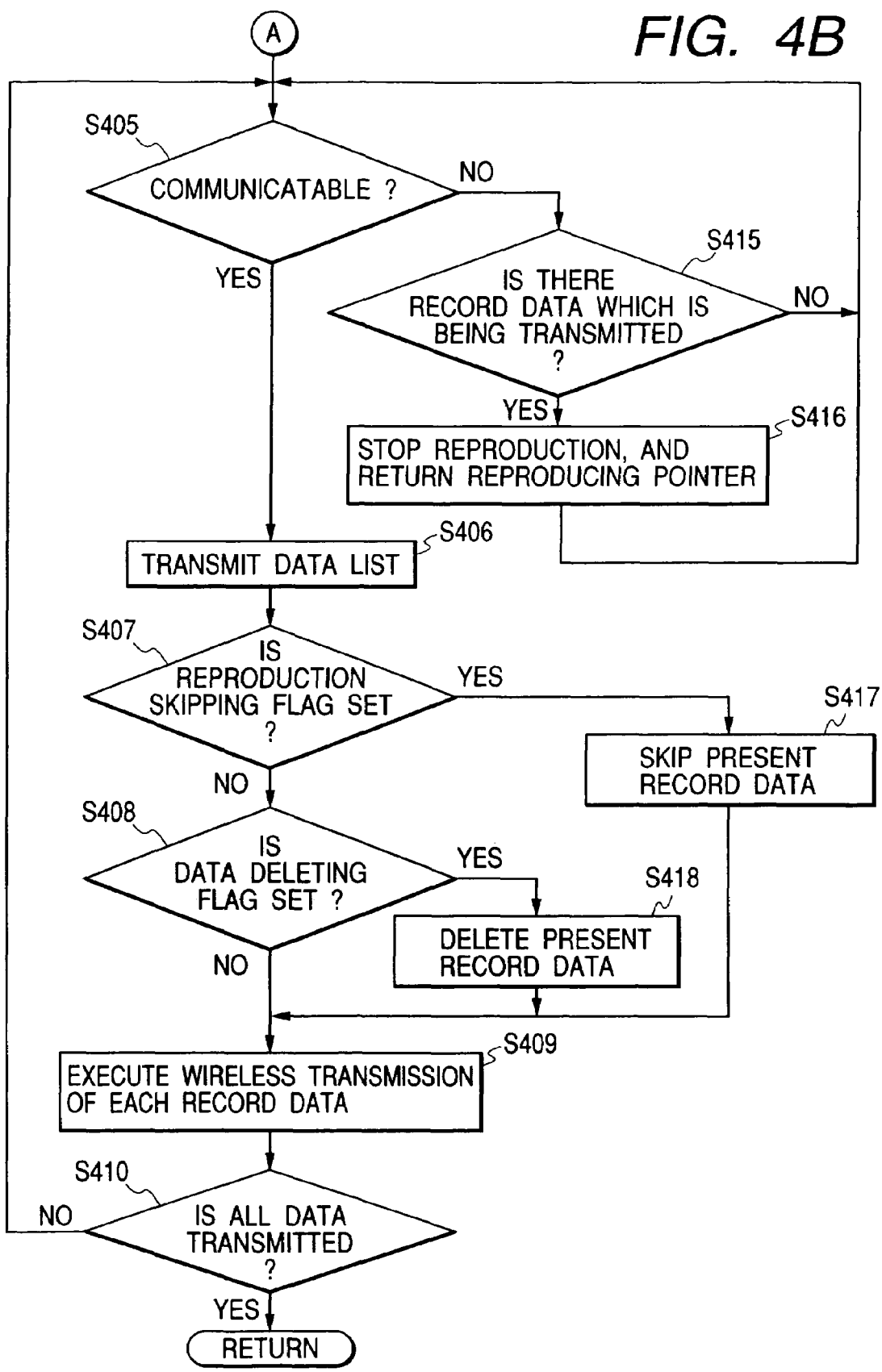

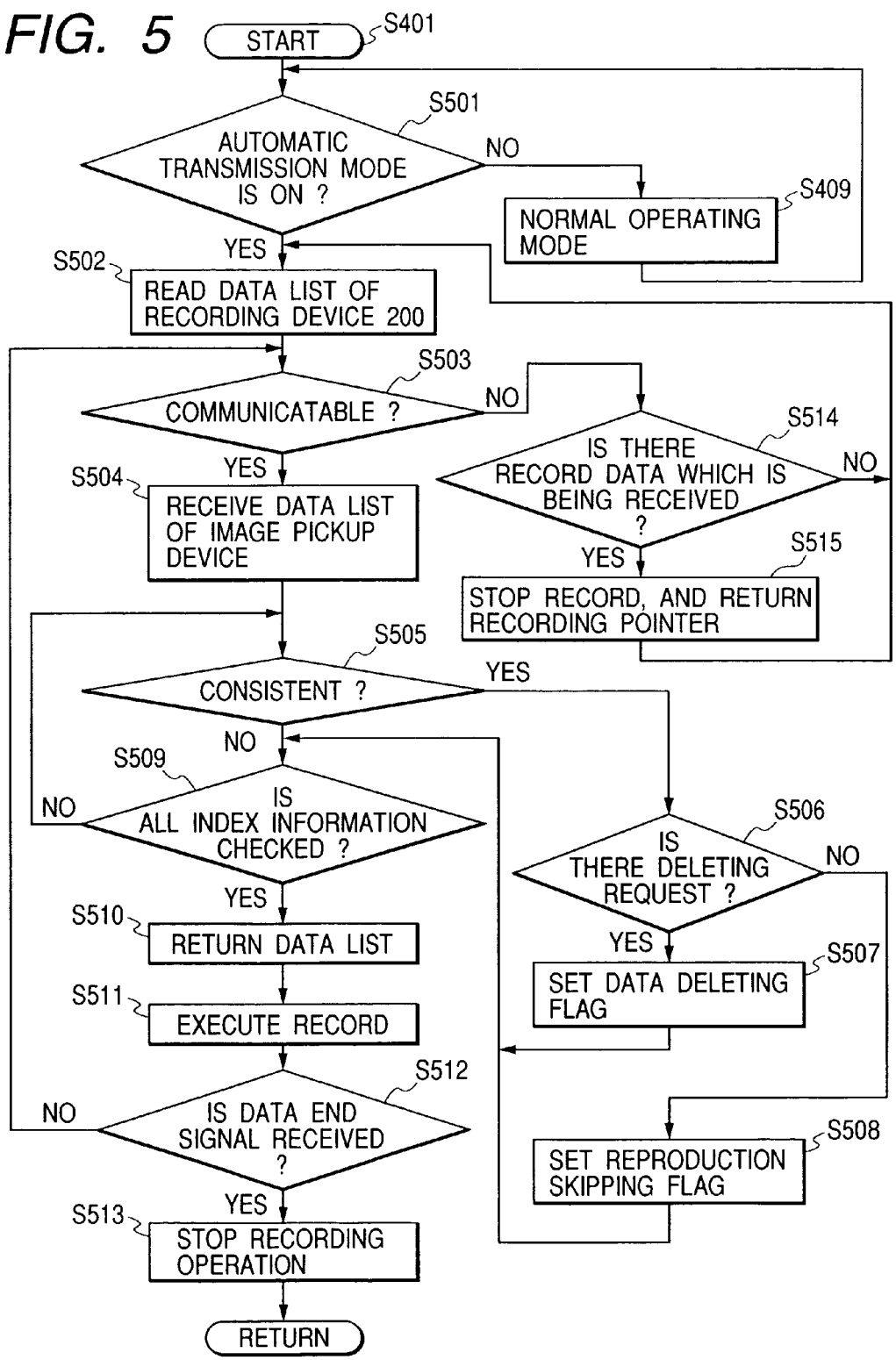

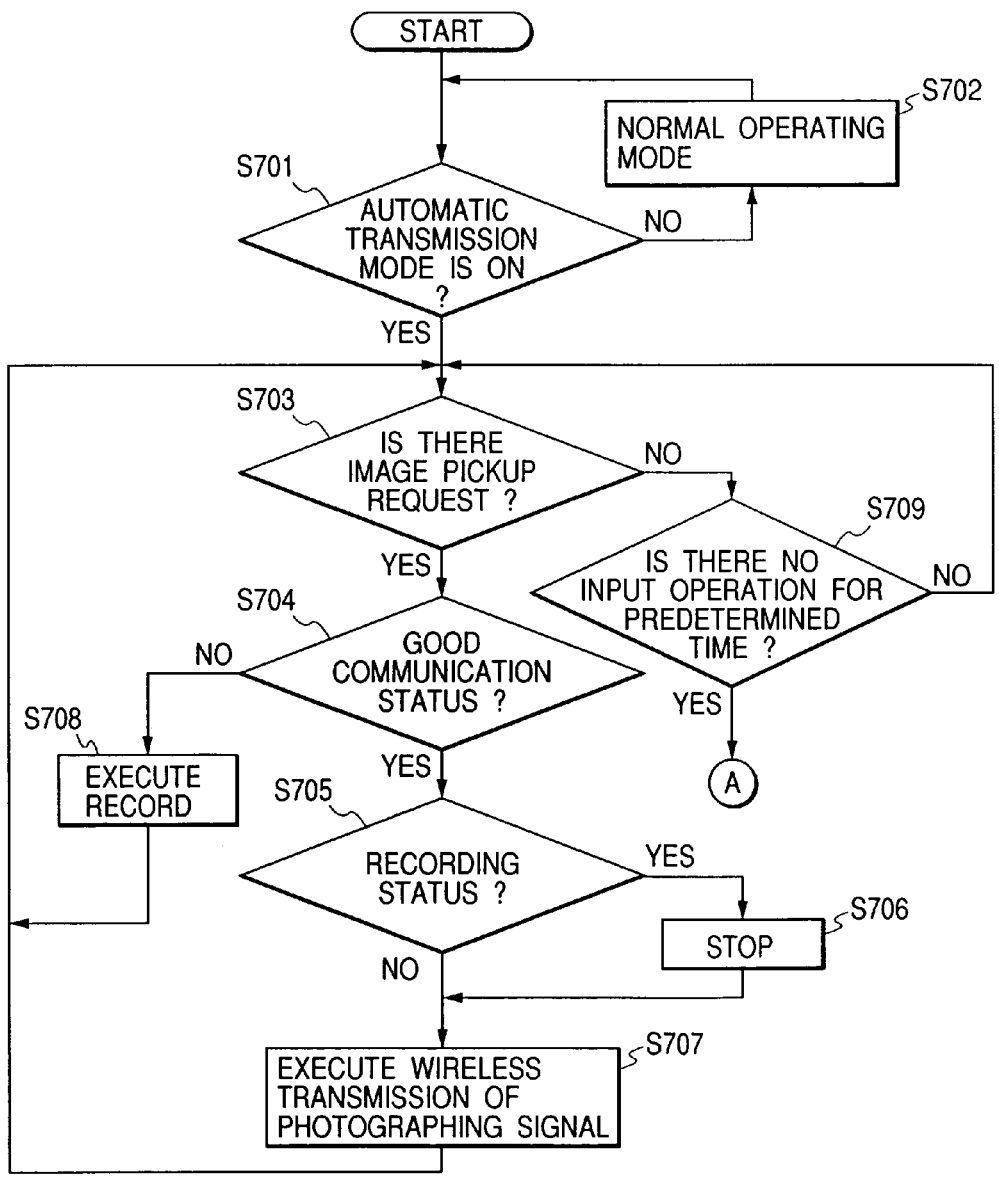

FIG. 8

| INDEX NUMBER | TITLE | PREPARED TIME | IMAGE FILE NAME | AUDIO FILE NAME | TRANSMISSION END FLAG | REPRODUCTION SKIPPING FLAG | DATA DELETING FLAG | LINK |
|---|---|---|---|---|---|---|---|---|
| INDEX 1 | AAAA | AAA | AAA.MPG | — | | | | |
| INDEX 2 | BBBB | BBB | BBB.JPG | BBB.WAU | | | | |
| INDEX 3 | CCCC | CCC | CCC.JPG | — | | | | |
| INDEX 4 | DDDD | DDD | DDD.MPG | — | | | | |
| INDEX 5 | EEEE | EEE | EEE.MPG | — | | | | INDEX 4 |
| INDEX 6 | FFFF | FFF | FFF.MPG | | | | | INDEX 5 |

801 802 803 804 805 806 807 808 809

IMAGE COMMUNICATION APPARATUS FOR WIRELESS COMMUNICATION OF DIGITAL IMAGES, AND METHOD THEREOF

BACKGROUND OF THE INVENTION

1. Field of the Invention

The present invention relates to an image communication apparatus, method and system, and more particularly to techniques of wireless (radio) transmission of digital image information picked up and stored by an electronic apparatus having an image pickup unit, to another recording device which records the received digital image information.

2. Related Background Art

An image pickup device (such as an electronic still image camera) for picking up still images has generally a recording medium having a small capacity. For example, the recording medium is a semiconductor memory such as an SRAM and a flash memory or a magnetic recording medium such as a floppy disk. An image pickup device (such as a camera integrated VTR) for picking up moving images stores the images in a recording medium such as a magnetic tape. Image data picked up and stored by such an image pickup device can be reproduced by utilizing an image reproduction function of the image pickup device itself.

In order to edit, modify and print image data, it is necessary to store the image data picked up by the image pickup device in a recording device (such as a storage unit) having a recording medium of a large capacity and to thereafter process the stored image data by using a personal computer or the like.

In such a case, a user is required to connect the image pickup device and recording device with a cable or infrared transceivers.

If a cable is used for such connection, the distance between the image pickup device and recording device is limited by the length of the cable. If the cable is short, the image pickup device and recording device are required to be set near to each other. If infrared transceivers or the like are used for such connection, an occurrence frequency of transmission errors may become high depending upon the communication state of a transmission path, and reliable data communication may become impossible.

In order to transfer image data picked up by the image pickup device to the recording device, a user is required to manually perform all operations from selection of image data to transfer thereof. The user operations therefore become complicated.

It is also necessary for the user to manually perform all operations including deletion of image data on the side of the image pickup device, after the data picked up by the image pickup device is stored in the recording device. The user operations therefore become complicated.

SUMMARY OF THE INVENTION

An object of the present invention is to solve the above-described problems.

Another object of the invention is to provide techniques allowing an image communication apparatus, method and system to efficiently and reliably record and store image data (information) picked up by an image pickup device in a remote recording device.

As a preferred embodiment for such objects, the invention discloses an image capture apparatus that communicates with an external recording apparatus using a wireless communication unit. The image capture apparatus includes: (1) an image capture unit adapted to capture a digital image; (2) a recording unit adapted to record the digital image captured by the image capture unit on a recording medium; and (3) a control unit adapted to judge whether or not the digital image recorded on the recording medium is already transmitted to the external recording apparatus, using information corresponding to the digital image recorded on the recording medium. The control unit automatically transmits the digital image recorded on the recording medium to the external recording apparatus if it is judged that the digital image recorded on the recording medium is not already transmitted to the external recording apparatus, and avoids transmitting the digital image recorded on the recording medium to the external recording apparatus if it is judged that the digital image recorded on the recording medium is already transmitted to the external recording apparatus.

As another preferred embodiment, the invention discloses an image capture apparatus that communicates with an external recording apparatus using a wireless communication unit. The image capture apparatus includes: (1) an image capture unit adapted to capture a digital image; (2) a recording unit adapted to record the digital image captured by the image capture unit on a recording medium; and (3) a control unit adapted to judge whether or not the digital image recorded on the recording medium is already transmitted to the external recording apparatus, using information corresponding to the digital image recorded on the recording medium. The control unit automatically transmits the digital image recorded on the recording medium to the external recording apparatus if it is judged that the digital image recorded on the recording medium is not already transmitted to the external recording apparatus, and deletes the digital image recorded on the recording medium from the recording medium if it is judged that the digital image recorded on the recording medium is already transmitted to the external recording apparatus.

As another preferred embodiment, the invention discloses a method performed by an image capture apparatus, the image capture apparatus communicates with an external recording apparatus using a wireless communication unit and includes an image capture unit adapted to capture a digital image and a recording unit adapted to record the digital image captured by the image capture unit on a recording medium. The method includes steps of: (1) judging whether or not the digital image recorded on the recording medium is already transmitted to the external recording apparatus, using information corresponding to the digital image recorded on the recording medium; and (2) automatically transmitting the digital image recorded on the recording medium to the external recording apparatus if it is judged that the digital image recorded on the recording medium is not already transmitted to the external recording apparatus. The digital image recorded on the recording medium is not transmitted to the external recording apparatus if it is judged that the digital image recorded on the recording medium is already transmitted to the external recording apparatus.

As another preferred embodiment, the invention discloses a method performed by an image capture apparatus, the image capture apparatus communicates with an external recording apparatus using a wireless communication unit, and includes an image capture unit adapted to capture a digital image and a recording unit adapted to record the digital image captured by the image capture unit on a recording medium. The method includes the steps of: (1) judging whether or not the digital image recorded on the recording medium is already transmitted to the external recording apparatus, using information corresponding to the digital image recorded on the recording medium; (2) automatically transmitting the digital image recorded on the recording medium to the external recording apparatus if it is judged that the digital image recorded on the recording medium is not already transmitted to the external recording apparatus; and (3) deleting the digital image recorded on the recording medium from the recording medium if it is judged that the digital image recorded on the recording medium is already transmitted to the external recording apparatus.

Still other objects of the present invention, and the advantages thereof, will become fully apparent from the following detailed description of the embodiments.

BRIEF DESCRIPTION OF THE DRAWINGS

FIG. 4 which is composed of FIGS. 4A and 4B are flow charts illustrating an example of a process sequence to be executed by the image pickup device of the embodiment.

FIG. 5 is a flow chart illustrating an example of a process sequence to be executed by the recording device of the embodiment.

FIG. 8 is a diagram showing an example of a data list according to the embodiments.

DETAILED DESCRIPTION OF THE PREFERRED EMBODIMENTS

The preferred embodiments of the present invention will now be described in detail hereinafter with reference to the accompanying drawings.

First Embodiment

An image communication system of the first embodiment has two image pickup devices 100 and a recording device 200. The image pickup device 100 digitalizes picked-up images (either still images or moving images) and stores them. For example, the image pickup device 100 is a camera integrated VTR or a digital camera. The recording device 200 has a recording medium of a large capacity connectable to a personal computer, an image editing apparatus or the like, and may be a storage unit, a home server or the like. The image pickup devices 100 and recording device 200 can be set at remote locations for wireless communications.

Each image pickup device 100 is set at a normally communicable distance from the recording device 200. The image pickup device 200 has an operation mode of automatically performing wireless transmission of record data (including video and audio data) picked up and stored in the past by the device 200 to the recording device 200 at the remote site, if the communication state of a transmission path is good. The recording device 200 has an operation mode of recording and storing record data (including video and audio data) automatically wireless-transmitted from each image pickup device 100. These operation modes are simply called an "automatic transmission mode", hereinafter.

Figure 1:
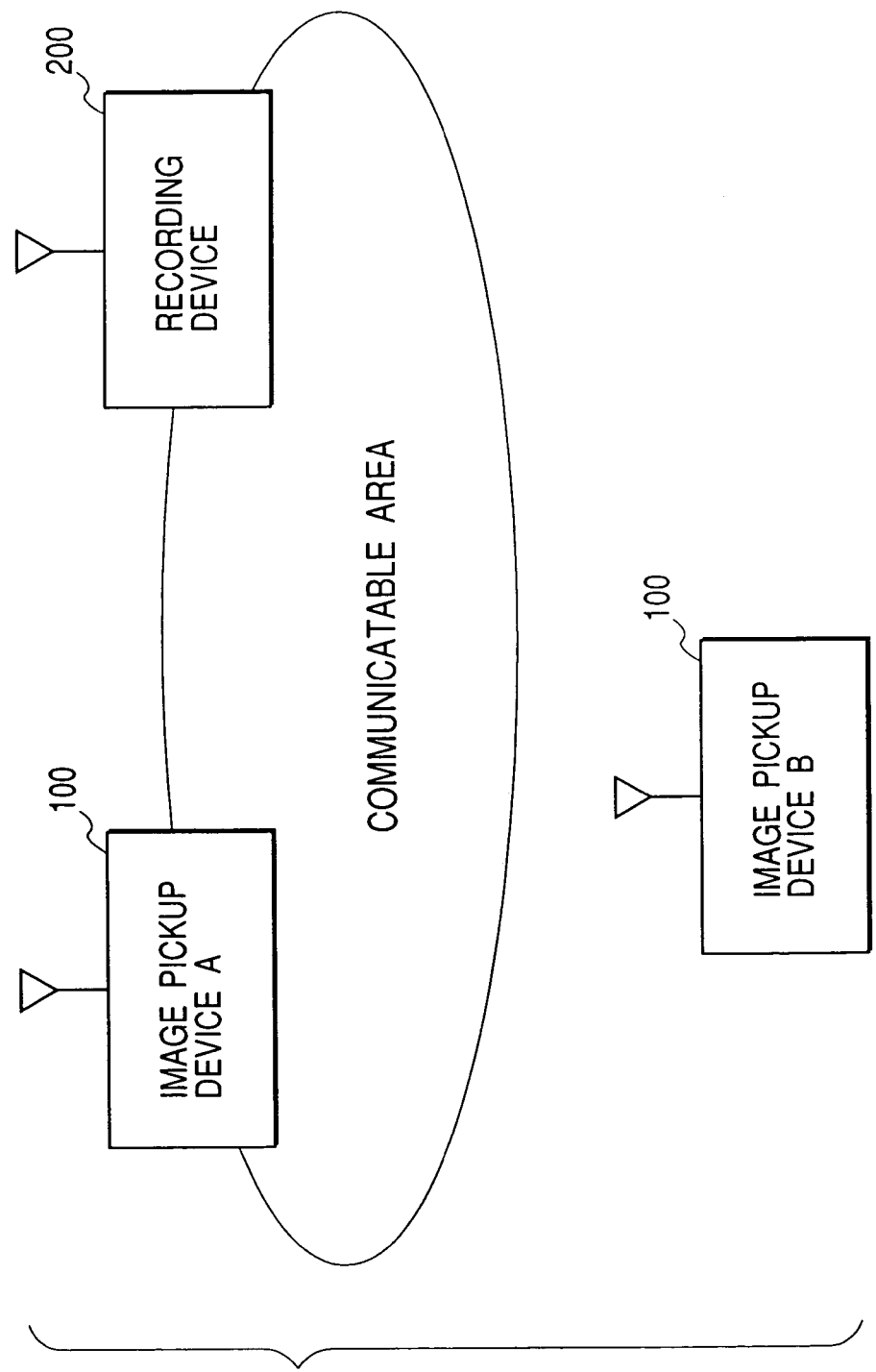
FIG. 1 is a block diagram showing an example of an image communication system according to an embodiment of the invention.

For example, if the automatic transmission mode is ON at the image pickup devices A100 and B100 and at the recording device 200 shown in FIG. 1, the following operations are executed. Since the image pickup device A100 and recording device 200 are set in the communicable area, they start executing wireless transmission if the communication state of the transmission path is good. On the other hand, since the image pickup device B100 and recording device 200 are not set in the communicatable area, they operate independently even if the communication state of the transmission path is good.

The structure and operation of the image communication system of the first embodiment will be described in detail with reference to the accompanying drawings.

Figure 2:
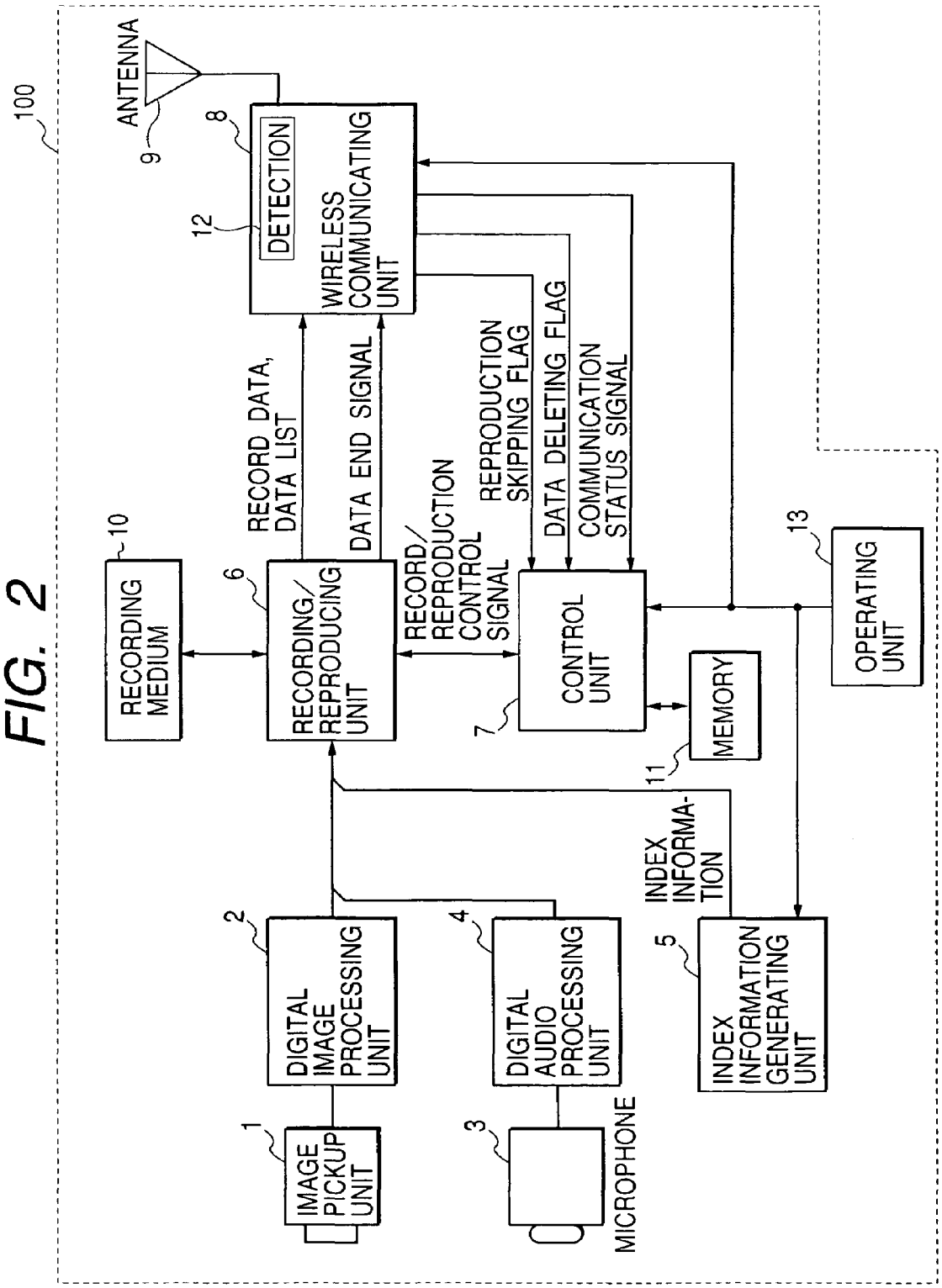
FIG. 2 is a block diagram showing an example of an image pickup device according to the embodiment.

FIG. 2 is a block diagram showing the structure of the image pickup device 100 of the first embodiment. Each component of the image pickup device will be described below.

Referring to FIG. 2, an image pickup unit 1 has image pickup elements such as a CCD. The image pickup unit 1 picks up the optical image of an object and generates image signals of a predetermined format. The image pickup unit 1 picks up and outputs not only still image signals but also moving image signals. A digital image processing unit 2 digitalizes image signals to perform high efficiency encoding. For example, the digital image processing unit 2 compression-encodes picked-up still images in accordance with JPEG, whereas it compression-encodes picked-up moving images in accordance with MPEG.

A microphone 3 converts external sounds into electric signals. A digital audio processing unit 4 digitalizes audio signals to perform high efficiency encoding.

An index information generating unit 5 automatically generates unique index information corresponding to video and audio information each time a user starts picking up images. This index information is stored as a data list in a recording medium 10 in a predetermined record area. An example of the structure of the data list is shown in FIG. 8.

In FIG. 8, reference numeral 801 represents a field in which index numbers for identifying the index information are stored, reference numeral 802 represents a field in which titles input in advance from an operating unit 13 are stored, and reference numeral 803 represents a field in which date and time when each image is picked up are stored. Reference numeral 804 represents a field in which the name of each image data file is stored, and reference numeral 805 represents a field in which the name of each audio data file is stored. The fields 804 and 805 store the extension of each data file so that the data format and data type (still image or moving image) of each data file can be discriminated. Reference numeral 806 represents a field in which a transmission end flag to be described later is stored, reference numeral 807 represents a field in which a reproduction skipping flag to be described later is stored, and reference numeral 808 represents a field in which a data deleting flag to be described later is stored. Reference numeral 809 represents a field in which an index number of other index information is set. With this field 809, a link to other list information can be recognized.

A recording/reproducing unit 6 stores digital video data and digital audio data in the recording medium (such as a magnetic tape and a magnetic disc) 10, in correspondence with the list information, and reads the video and audio data from the recording medium 10. The digital video and audio data is stored as one or a plurality of files. For example, the digital video and audio data of MPEG is stored in the same file, whereas the digital video and audio data of JPEG is stored in different files.

A control unit 7 controls the whole operation of the image pickup device 100. The operation of controlling the recording/reproducing unit 6 will be later described. The control unit 7 reads program codes prestored in a memory 11 to control the whole operation of the image pickup device 100.

A wireless communicating unit 8 generates transmission data in accordance with the list information and corresponding digital video and audio data (hereinafter simply called record data), modulates the transmission data, for example, through spread spectrum, and thereafter wireless-transmits it to the remote recording device 200 via an antenna 9. The wireless communicating unit 8 also wireless-transmits the data list in the image pickup device 100 in the form of the transmission data. The wireless communication unit 8 spread-spectrum-modulates the transmission data through code division multiplex so that data communication can be realized at a high transmission rate.

The wireless communication unit 8 has a detection circuit 12 for detecting whether or not the distance to the recording device 200 is in a normally communicatable range and whether or not the communication state of the transmission path is good. The detection results of the detection circuit 12 are supplied as communication state signals to the control unit 7. The wireless communicating unit 8 also receives the data list (set with the reproduction skipping flag and data deleting flag) and control signals returned from the remote recording device 200, and supplies them to the control unit 7.

The operating unit 13 is used for notifying an image pickup request, an ON/OFF of the automatic transmission mode or other operations, to the control unit 7 and the like.

Although the image pickup device 100 of the first embodiment wireless-transmits transmission data via the antenna 9, the invention is not limited only thereto. For example, the transmission data may be transmitted via an infrared LED or a laser diode by modulating the transmission data with an infrared ray or a laser beam.

Figure 3:
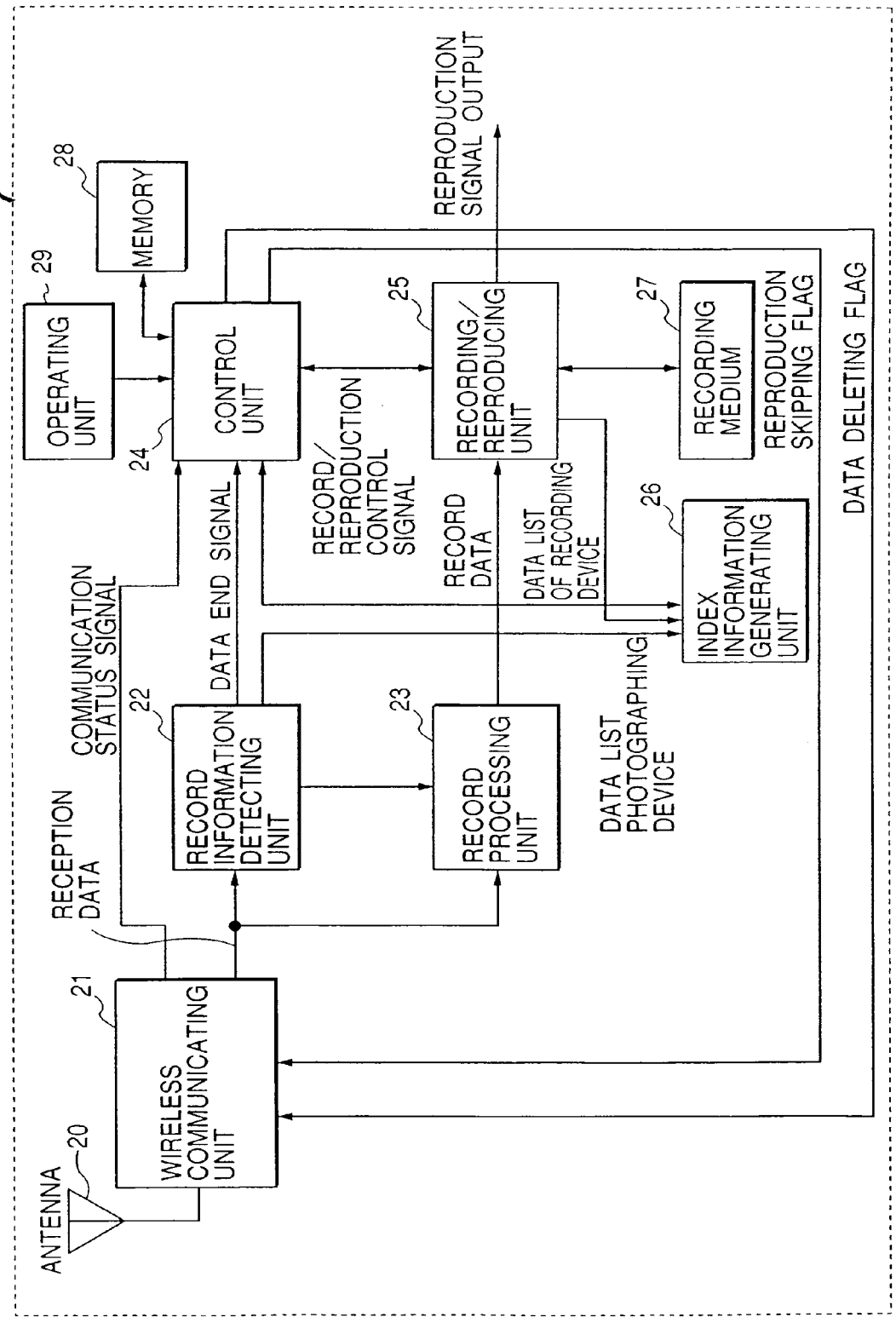
FIG. 3 is a block diagram showing an example of a recording device according to the embodiment.

FIG. 3 is a block diagram showing the structure of the recording device 200 of the first embodiment. Each component of the recording device 200 will be described below.

Referring to FIG. 3, a wireless communicating unit 21 demodulates transmission data received at an antenna 20 and wireless-transmits the data list (set with the reproduction skipping flag or data deleting flag) of the image pickup device 100 at the remote site and control signals, to the image pickup device 100.

A record information detecting unit 22 detects the data list and index information corresponding to each record data from the signal received and demodulated by the wireless communicating unit 21. A record processing unit 23 recognizes the data format and data type of each record data in accordance with the index information of the record data. If it is set so that the record data is stored after the data format thereof is converted into a predetermined data format, the record processing unit 23 converts the received record data into the predetermined format.

It is assumed, for example, that the predetermined format is MPEG and the data format of the received record data is JPEG. In this case, the record processing unit 23 converts the record data of JPEG into the format of MPEG. If the received record data is MPEG, the record processing unit 23 uses the received record data without data format conversion. Since still and moving image data is stored by using the same data format, the image processing (such as editing, modifying and synthesizing) after the record data is stored can be simplified. The predetermined data format is not limited only to MPEG, but other data formats may also be used.

A control unit 24 reads program codes prestored in a memory 28 and controls the whole operation of the recording device 200.

A recording/reproducing unit 25 stores each list information of the data list and each record data in a recording medium (such as a magnetic tape and a magnetic disc) 27 in correspondence with the list information, and reads the stored information from the recording medium 27. The data list in the recording device 200 is generated for each image pickup device 100 and stores in the recording medium in a predetermined record area.

A list information comparing unit 26 compares the data list transmitted from the image pickup device 100 with the data list stored in the recording medium 27, to thereby check whether there is list information having the coincident contents.

An operating unit 29 notifies the control unit 24 of a deletion request, an ON/OFF of the automatic transmission mode, setting of the data format to be automatically used for data format conversion (MPEG in this embodiment) or the like.

Although the recording device 200 of the first embodiment receives the record data via the antenna 20, the invention is not limited only thereto. For example, record data modulated with an infrared ray or a laser beam may be received via an infrared LED or a laser diode.

The structures of the image pickup device 100 and recording device 200 of the first embodiment have been described above.

Next, the operations of the image pickup device 100 and recording device 200 of the first embodiment will be described in detail.

First, the operation of the image pickup device 100 will be described. If the automatic transmission mode is OFF, the image pickup device 100 operates in a normal operating mode. In this mode, the image pickup device 100 does not use the wireless communication with the recording device 200, but operates independently. This normal operating mode includes an image pickup mode and a reproduction mode. In the image pickup mode, in response to a presence/absence of an "image pickup request" from a user, still or moving images are picked up and stored together with audio data in the recording medium 10. In the reproduction mode, video and audio data stored in the recording medium 10 is read and reproduced.

Next, the operation to be executed when the automatic transmission mode is ON will be described. Also in this mode, the image pickup device 100 can use the image pickup mode and reproduction mode. However, if the "image pickup request" or the like is not entered during a predetermined time duration, the image pickup device 100 executes the following operation.

It is checked at a predetermined timing interval whether the wireless communicating unit 8 of the image pickup device 100 and the wireless communicating unit 21 of the recording device 200 are in the normally communicatable range and whether the communication state of the transmission path is good, to thereby judge whether both the wireless communication units can communicate each other.

First, the case (1) that it is judged as communicatable will be described. In this case, the image pickup device 100 automatically controls to execute wireless transmission of record data.

In this case, the wireless communicating unit 8 of the image pickup device 100 supplies the control unit 7 with a communication state signal representative of "communicatable". Under the control of the control unit 7, the recording/reproducing unit 6 reads the record data from the recording medium 10. The record data read from the recording/reproducing unit 6 is modulated (e.g., spread-spectrum modulation) by the wireless communicating unit 8 and wireless-transmitted to the recording device 200 via the antenna 9.

Similarly, the wireless communicating unit 21 of the recording device 200 supplies the control unit 24 with a communication state signal representative of "communicatable". The control unit 24 controls the recording/reproducing unit 25 to prepare for recording the record data.

Next, the case (2) that it is judged that good wireless communication cannot be obtained because of relocation of the image pickup device 100 or recording device 200 or obstacles on the transmission path, will be described. In this case, the image pickup device 100 automatically controls not to execute wireless transmission of record data.

In this case, the wireless communicating unit 8 of the image pickup device 100 supplies the control unit 7 with a communication state signal representative of "not communicatable". Under the control of the control unit 7, the recording/reproducing unit 6 stops reproducing the record data. The record data intermediately stopped its reproduction is reproduced when the communicatable state becomes good.

Similarly, the wireless communicating unit 21 of the recording device 200 supplies the control unit 24 with a communication state signal representative of "not communicatable". Under the control of the control unit 24, the recording/reproducing unit 25 stops recording received data. Then, the control unit 24 deletes the received data intermediately stopped its record and controls so as to receive the data from the start thereof.

Next, the case (3) that it is judged as communicatable because the bad communication state changed to the good communication state, will be described. In this case, the image pickup device 100 automatically resumes execution of wireless transmission of record data.

In this case, the wireless communicating unit 8 of the image pickup device 100 supplies the control unit 7 with a communication state signal representative of "communication recovery". Under the control of the control unit 7, the recording/reproducing unit 6 resumes the reproduction of the record data. In this case, the recording/reproducing unit 6 resumes the reproduction in the unit of data corresponding to the list information. Therefore, if reproduction of the data corresponding to some list information is intermediately stopped, the data is reproduced from the start thereof.

Similarly, the wireless communicating unit 21 of the recording device 200 supplies the control unit 24 with a communication state signal representative of "communication recovery". Under the control of the control unit 24, the recording/reproducing unit 25 resumes recording the received data. In this case, the recording/reproducing unit 25 records the received data in the unit of data corresponding to the list information. Therefore, if recording the data corresponding to some list information is intermediately stopped, the data is recorded from the start thereof.

The processes of the cases (1) to (3) are executed until all record data in the recording medium 10 is recorded in the recording medium 27. After all the record data is transmitted, the image pickup device 100 executes wireless transmission of a data end signal to the recording device. After the data end signal is received, the recording device 200 stops its recording operation. As a user records new picked-up images, the above-described processes automatically start.

Next, the operation of the recording device 200 will be described. If the automatic transmission mode is OFF, the recording device 200 operates in the normal operating mode. In this case, the recording device 200 operates independently without executing wireless communication with the image pickup device 100. On the other hand, if the automatic transmission mode is ON, the recording device 200 performs the following operation.

Upon reception of the data list of the image pickup device 100, the recording device 200 supplies the received data list to the list information comparing unit 26. The list information comparing unit 26 compares the data list of the image pickup device 100 with the data list of the recording device 200 to judge whether there is list information having the coincident contents.

First, the case (4) that a user does not issue "deletion request" in advance, will be described. If there is list information having the coincident contents, the control unit 24 sets the reproduction skipping flag to the field 807 of the data list of the image pickup device 100 corresponding to the list information. The reproduction skipping flag is not set for the list information having different contents.

After the process is performed for all list information in the data list of the image pickup device 100, the list information comparing unit 26 returns the data list (with the reproduction skipping flag being set) of the image pickup device 100 back to the image pickup device 100 via the control unit 24 and wireless communicating unit 21.

In accordance with the returned data list, the image pickup device 100 skips the reproduction of the record data with the set reproduction skipping flag, and executes wireless transmission of other record data. It is therefore possible to prevent the image pickup device 100 from again transmitting the record data already recorded by the recording device 200, and to automatically execute wireless transmission of other record data.

Next, the case (5) that a user issues "deletion request" in advance, will be described. If there is list information having the coincident contents, the control unit 24 sets the data deleting flag to the field 808 of the data list of the image pickup device 100 corresponding to the list information. The data deleting flag is not set for the list information having different contents. After the process is performed for all list information in the data list of the image pickup device 100, the list information comparing unit 26 returns the data list (with the data deleting flag being set) of the image pickup device 100 back to the image pickup device 100 via the control unit 24 and wireless communicating unit 21.

In accordance with the returned data list, the image pickup device 100 deletes the record data with the set data deleting flag, and executes wireless transmission of other record data. It is therefore possible to prevent the image pickup device 100 from again transmitting the record data already recorded by the recording device 200, and to automatically execute wireless transmission of other record data. Since the record data in the image pickup device 100 can be automatically deleted, it is possible to prevent a cumbersome operation of replacing the recording medium of the image pickup device 100 by another recording medium, and to efficiently use one recording medium.

FIGS. 4A and 4B are flow charts illustrating the operation sequence to be executed by the image pickup device 100 of the first embodiment. The control unit 7 of the image pickup device 100 controls the whole operation of the image pickup device 100 in accordance with the flow charts of FIGS. 4A and 4B. Program codes for realizing the flow charts of FIGS. 4A and 4B are being stored in the memory 11.

At Step S401 the control unit 7 judges whether the automatic transmission mode is ON. If not, the control unit 7 enters the normal operating mode (S419).

If the automatic transmission mode is ON, the control unit 7 judges at Step S402 whether there is an image pickup request from a user. If not, the control unit 7 judges at Step S403 whether the recording/reproducing unit 6 is in a recording/reproducing status. If not, the control unit 7 judges at Step S404 whether there is an input from a user during the predetermined time duration.

If there is no input from a user during the predetermined time duration, the control unit 7 judges at Step S405 from the communication state signal output from the wireless communicating unit 8 whether the communication state is communicatable. If it is judged as communicatable, the control unit 7 executes at Step S406 wireless transmission of the data list stored in the recording medium 10 to the recording device 200. In this case, the list information already set with the transmission end flag is not transmitted. The recording device 200 compares the received data list with the data list managed by the recording device 200. If there is list information having the coincident contents, the reproduction skipping flag or data deleting flag is set to the list information. After the process is executed for all list information in the data list, the recording device 200 returns the data list back to the image pickup device 100.

In accordance with the data list returned from the recording device 200, the image pickup device 100 judges whether wireless transmission of the record data corresponding to list information can be executed. Reproducing the record data corresponding to the list information with the set reproduction skipping flag is skipped, and the transmission end flag is set to the field 806 of the list information (S407, S417).

For the list information with the set data deleting flag, the list information and the record data corresponding to the list information are deleted (S408, S418).

For the list information set with neither the reproduction skipping flag nor the data deleting flag, wireless transmission of the record data corresponding to the list information to the recording device 200 is executed. If the recording device 200 confirms that the record data is normally received, the control unit 7 sets the transmission end flag to the field 806 of the list information (or deletes the record data), and executes the process for the next list information. If the recording device 200 cannot confirm that the record data is normally received, the control unit 7 executes again wireless transmission of the record data (S409).

At Step S410, the control unit 7 repeats the processes at Step S405 and succeeding Steps until the transmission end flag is set to the fields 806 of all list information in the data list (or until all record data is deleted). After transmission of all record data is completed, the image pickup device 100 transmits a data end signal to the recording device 200 to thereafter return to Step S401.

Next, the case that it is judged at Step S402 that there is an image pickup request, will be described. In this case, the control unit 7 judges at Step S411 whether the recording/reproducing unit 6 is in the reproducing status. If in the reproducing status, the recording/reproducing unit 6 stops the reproducing operation at Step S412. At Step S413 the recording/reproducing unit 6 records the new picked-up image together with the list information in the vacant area of the recording medium 10. After the picked-up image is stored, the control unit 7 returns to the control Step S402.

Next, the case that it is judged at Step S403 that the recording/reproducing unit 6 is in the recording or reproducing status, will be described. In this case, the recording/reproducing unit 6 continues the recording or reproducing operation at Step S414. After the recording or reproducing is completed, the control unit 7 returns to the control Step S402.

Next, the case that it is judged at Step S405 that the communication state between the image pickup device 100 and recording device 200 is not communicatable, will be described. In this case, the control unit 7 judges at Step S415 whether there is record data presently under wireless transmission. If there is no record data presently under wireless transmission, the control unit 7 returns to the control Step S405.

If there is record data presently under wireless transmission, at Step S416 the control unit 7 stops the wireless transmission of the control data and sets a reproduction pointer of the recording/reproducing unit 6 to the start position of the record data.

FIG. 5 is a flow chart illustrating the operation sequence to be executed by the recording device 200 of the first embodiment. The control unit 24 of the recording device 200 controls the whole operation of the recording device 200 in accordance with the flow chart of FIG. 5. Program codes for realizing the flow chart of FIG. 5 are being stored in the memory 28.

At Step S501 the control unit 24 judges whether the automatic transmission mode is ON. If not, the control unit 24 enters the normal operating mode (S409). In this case, the recording device 200 accepts a control from an external apparatus (such as a personal computer and an editing apparatus) to edit and modify the already recorded information.

If the automatic transmission mode is ON, the control unit 24 reads the data list from the recording medium 27 and supplies it to the list information comparing unit 26.

Next, the control unit 24 judges at Step S503 from the communication state signal output from the wireless communicating unit 21 whether the communication state is communicatable. If it is judged that the communication state is communicatable, at Step S504 the control unit 24 receives the data list wireless-transmitted from the image pickup device 100 and supplies it to the list information comparing unit 26. At Step S505 the list information comparing unit 26 compares the list information contained in the data list of the image pickup device 100 with the list information contained in the data list of the recording device 200 to thereby judge whether the contents thereof are coincident.

If the data list of the recording device 200 contains the list information having the same contents, the control unit 24 judges at Step S506 whether the deleting request is already set. If already set, the control unit 24 sets the data deleting flag to the list information of the image pickup device 100 (S507). If the deleting request is not already set, the control unit 24 sets the reproduction skipping flag to the list information of the image pickup device 100 (S508).

After the process is completed for all list information contained in the data list of the image pickup device 100, at Step S510 the recording device 200 returns the data list of the image pickup device 100 back to the image pickup device 100. At Step S511 the recording device 200 receives the record data and list information sequentially wireless-transmitted from the image pickup device 100 and stores them in the recording medium 27. The data list of the recording device 200 is therefore updated. Each time the record data is normally stored, the recording device 200 transmits a record confirmation signal representative of a normal record completion to the image pickup device 100.

Until the recording device 200 eventually receives the data end signal from the image pickup device 100, it executes Step S503 and succeeding Steps (S512). When the recording device 200 receives the data end signal from the image pickup device 100, at Step S513 the control unit 24 stops the recording operation of the recording/reproducing unit 25 to thereafter return to the control Step S501.

Next, the case that it is judged at Step S503 that the communication state between the image pickup device 100 and recording device 200 is not communicatable, will be described. In this case, the control unit 24 judges at Step S514 whether there is record data under reception. If not, the control unit 24 returns to the control Step S502.

If there is record data under reception, at Step S515 the control unit 24 stops recording the record data and sets the pointer of the recording/reproducing unit 25 to the start of the record data.

As described above, in the first embodiment, each image pickup device 100 and recording device 200 are provided with the automatic transmission mode. Therefore, the image communication system is realized which can automatically execute wireless transmission of digital video and audio data picked up and recorded in the past with the image pickup device 100 to the remote recording device 200, if the distance between the image pickup device 100 and recording unit 200 is in a normally communicatable range and if the communication state of the transmission path is good. Furthermore, this system can automatically stop data transmission if each device is not in the normally communicatable range or if the communication state of the transmission path is not good, and after the communication state becomes good, the system automatically resumes the data transmission.

With this configuration, it is possible to automatically store digital video and audio data picked up by the image pickup device 100 in the recording medium of the remote recording device 200, without particular attention of a user and a complicated work. Further, since the data transmission is automatically stopped if the communication state is not good, transmission errors and data loss can be minimized and the data can be recorded and stored reliably at the remote recording device 200.

Also in the first embodiment, reproduction of digital video and audio data already recorded in the recording device 200 can be automatically skipped. With this configuration, it is possible to prevent the same data from being duplicately reproduced and transmitted. The data transmission can therefore be executed efficiently.

Still also in the first embodiment, digital video and audio data already recorded in the recording device 200 can be automatically deleted. With this configuration, it is possible to prevent the same data from being duplicately reproduced and transmitted. The data transmission can therefore be executed efficiently. The recording medium of the image pickup device 100 can therefore be used efficiently.

Also in the first embodiment, it is possible to convert digital video data transmitted from the image pickup device 100 into a predetermined data format and to store it in the recording device 200. With this configuration, a work load of storage and maintenance of digital video data can be reduced and a work load of edition after recording can be reduced.

Second Embodiment

In the first embodiment, if the image pickup device 100 is neither in the image pickup state nor in the recording state, digital data (including video and audio data) picked up and recorded in the past by the image pickup device 100 can be automatically wireless-transmitted to the remote recording device 200 depending upon the communication state of the transmission path.

In the second embodiment, in addition to the configuration of the first embodiment, even if the image pickup device 100 is in the image pickup state, digital data (including video and audio data) presently picked up can be automatically wireless-transmitted to the remote recording device 200 depending upon the communication state of the transmission path. This configuration of the second embodiment will be described below.

The detailed structure and operation of the second embodiment will be described below with reference to the accompanying drawings.

Figure 6:
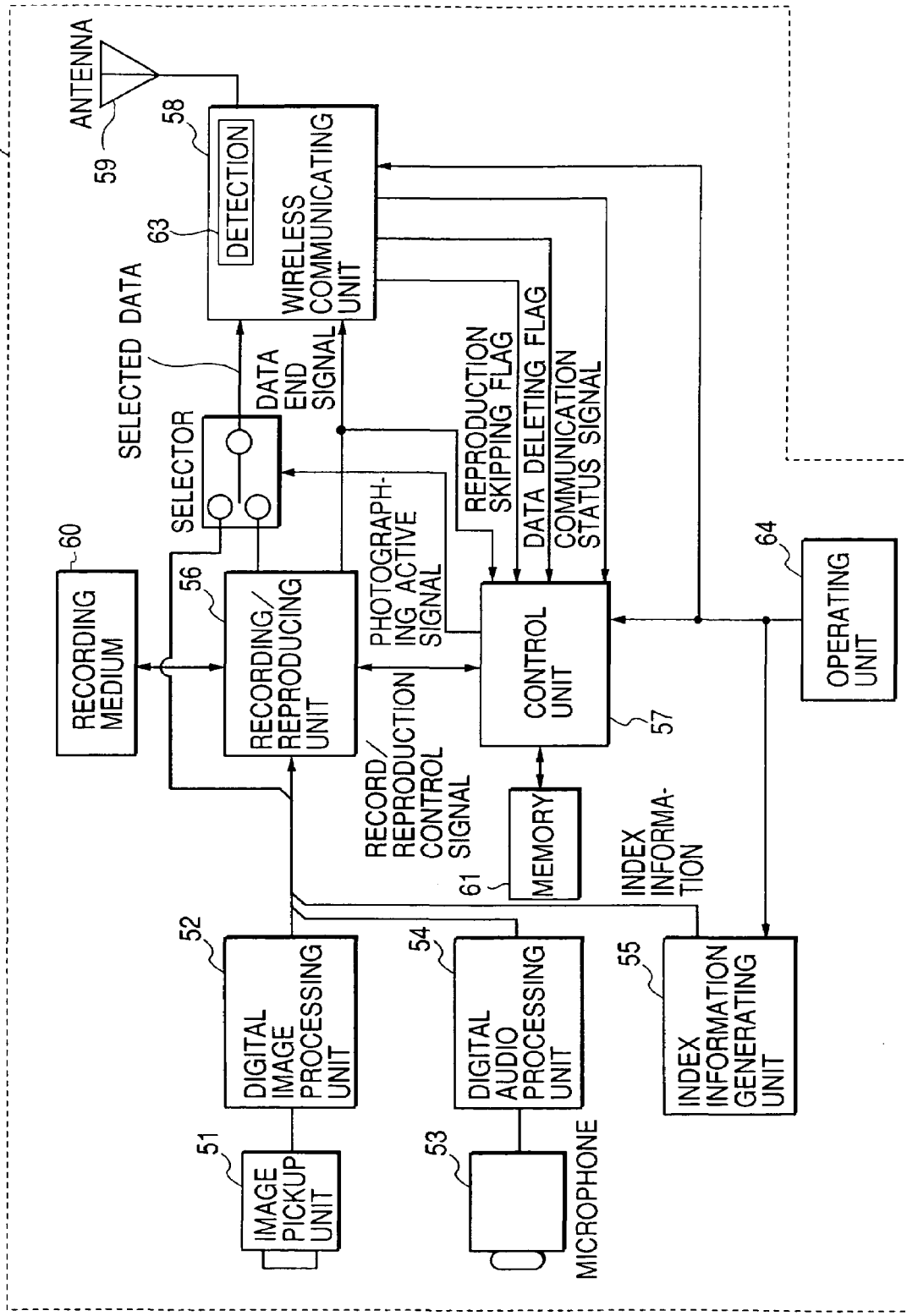
FIG. 6 is a block diagram showing another example of the image pickup device according to a second embodiment of the invention.

FIG. 6 is a block diagram showing the structure of an image pickup device 500 of the second embodiment. Each component of the image pickup device will be described below. Similar to the image pickup device 100 of the first embodiment, the image pickup device 500 may be a camera integrated VTR or a digital camera.

In FIG. 6, each of an image pickup unit 51, a digital image data processing unit 52, a microphone 53, and a digital audio data processing unit 54 has a similar function to that of a corresponding one of the image pickup unit 1, digital image data processing unit 2, microphone 3, and digital audio data processing unit 4 respectively shown in FIG. 2.

Each of a list information generating unit 55, a recording/reproducing unit 56, a wireless communicating unit 58 (including a detection circuit 63), a recording medium 60, and an operating unit 64 has a similar function to that of a corresponding one of the list information generating unit 5, recording/reproducing unit 6, wireless communicating unit 8 (including the detection circuit 3), recording medium 10, and operating unit 13 respectively shown in FIG. 1.

A control unit 57 controls the whole operation of the image pickup device 500. The operation of controlling the recording/reproducing unit 56 will be later described with reference to FIGS. 7A and 7B. The control unit 57 reads program codes prestored in a memory 61 to control the whole operation of the image pickup device 500.

A selector 62 selects either pickup data (including digital video and audio data under presently picked up) and corresponding list information output from the image pickup device 51 or record data (including digital video and audio data) and corresponding list information output from the recording medium 60, in accordance with an "image pickup active signal" supplied from the control unit 57.

A wireless communicating unit 58 generates transmission data in accordance with the pickup data and corresponding list information output from the selector 62 (or record data and corresponding list information output from the selector 62), modulates the transmission data, for example, through spread spectrum, and thereafter wireless-transmits it to the remote recording device 200 via an antenna 59. The wireless communicating unit 58 also wireless-transmits the data list in the image pickup device 500 in the form of the transmission data.

Although the image pickup device 500 of the second embodiment wireless-transmits transmission data via the antenna 59, the invention is not limited only thereto. For example, the transmission data may be transmitted via an infrared LED or a laser diode by modulating the transmission data with an infrared ray or a laser beam.

The structure of the image pickup device 500 of the second embodiment has been described above. The recording device 200 shown in FIG. 2 is used as the recording device corresponding to the image pickup device 500 of the second embodiment.

Next, the operation of the image pickup device 500 of the second embodiment will be described in detail.

First, the operation of the image pickup device 500 will be described. If the automatic transmission mode is OFF, the image pickup device 500 operates in the normal operating mode, similar to the first embodiment.

Next, the operation to be executed when the automatic transmission mode is ON, will be described. Also in this case, similar to the first embodiment, both the image pickup mode and reproduction mode can be used. However, if an "image pickup request" is issued or if there is no input such as the "image pickup request" during a predetermined time duration, the image pickup device 500 executes the following operation.

It is checked at a predetermined timing interval whether the wireless communicating unit 58 of the image pickup device 500 and the wireless communicating unit 21 of the recording device 200 are in the normally communicatable range and whether the communication state of the transmission path is good, to thereby judge whether both the wireless communication units can communicate each other.

First, the case (6) that it is judged as communicatable, will be described. In this case, the image pickup device 100 automatically controls to execute wireless transmission of pickup data or record data.

In this case, the wireless communicating unit 58 of the image pickup device 500 supplies the control unit 7 with a communication state signal representative of "communicatable". If the image pickup device 500 is in the image pickup state, the control unit 57 supplies the image pickup active signal representative of an "image pickup data" to the selector 62. The selector 62 selects the pickup data output from the image pickup device 51 and outputs it together with the list information.

If the image pickup device 500 is not in the image pickup state, the control unit 57 supplies the image pickup active signal representative of a "record data" to the selector 62. The selector 62 selects the record data output from the recording medium 60, and outputs it together with the list information. The pickup data (or record data) supplied from the selector 62 is modulated (e.g., spread-spectrum modulation) by the wireless communicating unit 58 and wireless-transmitted to the recording device 200 via the antenna 59.

Next, the case (7) that it is judged that good wireless communication cannot be performed because of relocation of the image pickup device 500 or recording device 200 or obstacles on the transmission path, will be described. In this case, the image pickup device 500 automatically controls not to execute wireless transmission of record data.

In this case, the wireless communicating unit 58 of the image pickup device 500 supplies the control unit 57 with a communication state signal representative of "not communicatable". If the image pickup device 500 is in the image pickup state, the wireless communicating unit 58 intercepts the wireless transmission of the pickup data, and the remaining pickup data is stored in the recording medium 60. The pickup data stored in the recording medium 60 is the pickup data immediately before the wireless transmission is intercepted. Therefore, the index number of the list information corresponding to the pickup data immediately before the interception, is set to the field 809 of the list information corresponding to the pickup data to be stored in the recording medium 60. In this manner, a link can be set between the pickup data before and after the wireless transmission interception. Therefore, even if the reception state during the image pickup state is changed and the consecutive pickup data is recorded separately in the image pickup device 500 and recording device 200, the recording device 200 can record and manage a plurality piece of pickup data with time sequential relation being retained, by using the list information.

If the image pickup device 500 is not in the image pickup state, under the control of the control unit 57, the recording/reproducing unit 56 stops reproduction of the record data. The record data whose reproduction was stopped intermediately is reproduced again from the start thereof when the communication state becomes again communicatable.

Similarly, the wireless communicating unit 21 of the recording device 200 transmits the communication state signal representative of "not communicatable" to the control unit 24. If the pickup image of the image pickup device 500 is being recorded, the control unit 24 stops the recording operation of the recording/reproducing unit 25 and controls the recording/reproducing unit 25 to record the pickup image. If the record data of the image pickup device 500 is being recorded, the control unit 24 stops the recording operation of the recording/reproducing unit 25 and controls the recording/reproducing unit 25 to delete the record data and prepare for recording the record data from the start thereof.

Next, the case (8) that the communication states changes from the bad state to the good state and the communication is possible between the image pickup device 500 and recording device 200, will be described. In this case, the image pickup device 500 automatically resumes wireless transmission of either the pickup data or the record data.

In this case, the wireless communicating unit 58 of the image pickup device 200 supplies the communication state signal representative of "communication recovery" to the control unit 57. If the image pickup device 500 is in the image pickup state, the control unit 57 supplies the image pickup active signal representative of the "image pickup data" to the selector 62. The selector 62 selects the pickup data output from the image pickup unit 51, and outputs it together with the list information. The field 809 of this list information is set with the index number of the list information corresponding to the pickup data immediately before resuming the communication.

If the image pickup device 500 is not in the image pickup state, the control unit 57 supplies the image pickup active signal representative of the "record data" to the selector 62. The selector 62 selects the record data output from the recording medium 60, and outputs it together with the list information. Then, the recording/reproducing unit 56 resumes reproducing the record data in the unit of data corresponding to the list information. Therefore, if reproducing data corresponding to the list information is stopped intermediately, the record data is reproduced again from the start thereof.

Similarly, the wireless communicating unit 21 of the recording device 200 supplies the communication state signal representative of the "communication recovery" to the control unit 24. Under the control of the control unit 24, the recording/reproducing unit 25 resumes recording the pickup data or record data.

The processes of the cases (6) to (8) are executed until all record data in the recording medium 10 is recorded in the recording medium 27 after the image pickup state is terminated. After all the record data is transmitted, the image pickup device 500 executes wireless transmission of the data end signal to the recording device 200. After the data end signal is received, the recording device 200 stops its recording operation. As a user records new picked-up images, the above-described processes automatically start.

Figure 7B:
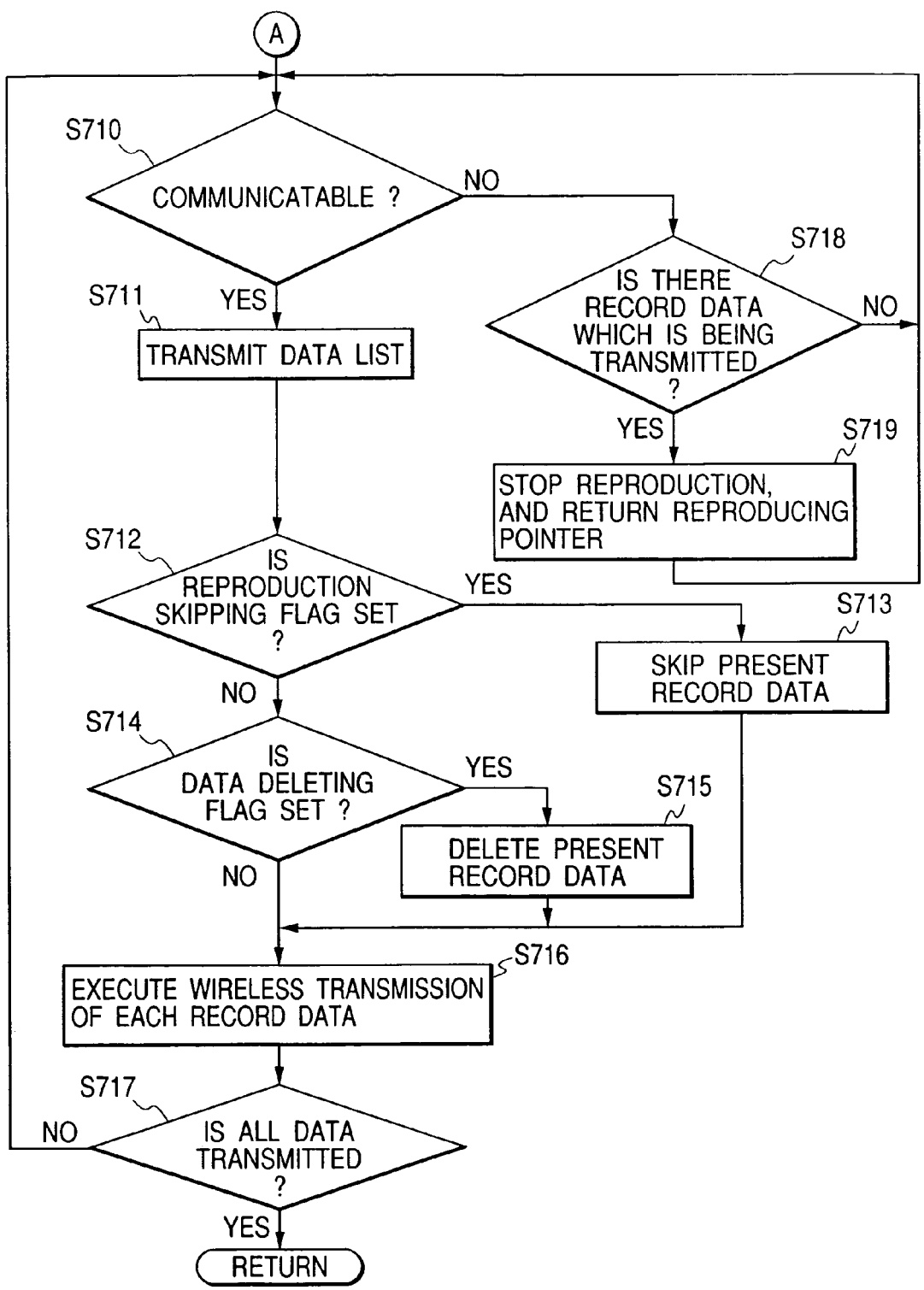
FIG. 7 which is composed of FIGS. 7A and 7B are flow charts illustrating another example of the process sequence to be executed by the image pickup device of the second embodiment.

FIGS. 7A and 7B are flow charts illustrating the operation sequence to be executed by the image pickup device 500 of the second embodiment. The control unit 57 of the image pickup device 500 controls the whole operation of the image pickup device 500 in accordance with the flow charts of FIGS. 7A and 7B. Program codes for realizing the flow charts of FIGS. 7A and 7B are being stored in the memory 61.

At Step S701 the control unit 5 judges whether the automatic transmission mode is ON. If not, the control unit 57 enters the normal operating mode (S702).

If the automatic transmission mode is ON, the control unit 57 judges at Step S703 whether there is an image pickup request from a user. If there is an image pickup request, the control unit 57 judges at Step S704 from the communication state signal output from the wireless communicating unit 58 whether the communication state is good.

If it is judged that the communication state is good, the control unit 57 judges at Step S705 whether the recording/reproducing unit 56 is in the recording state. If in the recording state, at Step S706 the control unit 57 outputs a recording/reproducing control signal and at Step S706 stops the recording operation of the recording/reproducing unit 56. At Step S707 the control unit 57 sets the image pickup active signal to the "image pickup mode". The selector 62 selects the digital video and audio data and corresponding list information presently picked up, and supplies them to the wireless communicating unit 21. The wireless communicating unit 21 executes wireless transmission of the transmission data constituted of the digital video and audio data and corresponding list information.

Next, the case that it is judged at Step S704 that the communication state is not good, will be described. In this case, at Step S708 the control unit 57 outputs the recording/reproducing control signal to make the recording/reproducing unit 56 start the recording operation, to thereafter return to the control Step S703.

Next, the case that it is judged that there is no image pickup request, will be described. In this case, at Step S709 the control unit 7 judges whether there is no input from a user during a predetermined time duration.

If there is no input from the user during the predetermined time duration, at Step S710 the control unit 57 judges from the communication state signal output from the wireless communicating unit 58 whether the communication state is communicatable. If it is judged as communicatable, the control unit 57 executes at Step S711 wireless transmission of the data list stored in the recording medium 60 to the recording device 200. In this case, the list information already set with the transmission end flag is not transmitted. The recording device 200 compares the received data list with the data list managed by the recording device 200. If there is list information having the coincident contents, the reproduction skipping flag or data deleting flag is set to the list information. After the process is executed for all list information in the data list, the recording device 200 returns the data list back to the image pickup device 500.

In accordance with the data list returned from the recording device 200, the image pickup device 500 judges whether wireless transmission of the record data corresponding to list information can be executed. Reproducing the record data corresponding to the list information with the set reproduction skipping flag is skipped, and the transmission end flag is set to the field 806 of the list information (S712, S713).

For the list information with the set data deleting flag, the list information and the record data corresponding to the list information are deleted (S714, S715).

For the list information set with neither the reproduction skipping flag nor the data deleting flag, wireless transmission of the record data corresponding to the list information to the recording device 200 is executed. If the recording device 200 confirms that the record data is normally received, the control unit 57 sets the transmission end flag to the field 806 of the list information (or deletes the record data), and executes the process for the next list information. If the recording device 200 cannot confirm that the record data is normally received, the control unit 57 executes again wireless transmission of the record data.

At Step S717, the control unit 57 repeats the processes at Step S710 and succeeding Steps until the transmission end flag is set to the fields 806 of all list information in the data list (or until all record data is deleted). After transmission of all record data is completed, the image pickup device 500 transmits a data end signal to the recording device 200 to thereafter return to Step S701.

Next, the case that it is judged at Step S710 that the communication state between the image pickup device 500 and recording device 200 is communicatable, will be described. In this case, the control unit 57 judges at Step S718 whether there is record data under wireless transmission. If not, the control unit 57 returns to the control Step S710.

If there is record data under wireless transmission, at Step S719 the control unit 57 stops the wireless transmission of the record data and sets a reproduction pointer of the recording/reproducing unit 56 to the start of the record data.

The flow chart illustrating the operation sequence of the recording device 200 of the second embodiment is similar to that shown in FIGS. 4A and 4B, and so the description thereof is omitted.

As described above, in the second embodiment, each image pickup device 500 and recording device 200 are provided with the automatic transmission mode. Therefore, the image communication system is realized which can automatically execute wireless transmission of digital video and audio data presently picked up by the image pickup device 500, or the digital video and audio data picked up in the past by the image pickup device 500, to the remote recording device 200, if the distance between the image pickup device 500 and recording unit 200 is in a normally communicatable range and if the communication state of the transmission path is good. Furthermore, this system can automatically stop data transmission if each device is not in the normally communicatable range or if the communication state of the transmission path is not good, and after the communication state becomes good, the system automatically resumes the data transmission. In this case, even if the digital images are recorded separately at the image pickup device 500 and recording device 200, it is possible to automatically manage the digital images in correspondence with the list information.

With this configuration, it is possible to automatically store digital video and audio data picked up by the image pickup device 500 in the recording medium of the remote recording device 200, without particular attention of a user and a complicated work, similar to the first embodiment. Further, since the data transmission is automatically stopped if the communication state is not good, transmission errors and data loss can be minimized and the data can be recorded and stored reliably at the remote recording device 200.

Also in the second embodiment, similar to the first embodiment, reproduction of digital video and audio data already recorded in the recording device 200 can be automatically skipped or deleted. With this configuration, it is possible to prevent the same data from being duplicately reproduced and transmitted. The data transmission can therefore be executed efficiently. If the data is automatically deleted, the recording medium of the image pickup device 500 can therefore be used efficiently.

Also in the second embodiment, similar to the first embodiment, it is possible to convert digital video data transmitted from the image pickup device 500 into a predetermined data format and to store it in the recording device 200. With this configuration, a work load of storage and maintenance of digital video data can be reduced and a work load of edition after recording can be reduced.

Furthermore, the recording device 200 of the second embodiment can record, if necessary, the digital image data automatically transferred from the image pickup device 500 in correspondence with the digital image data recorded in the past. With this configuration, a work load of storage and maintenance of digital video data in the recording medium can be reduced and a work load of edition after recording can be reduced.

The invention may be embodied in other specific forms without departing from the spirit or essential characteristics thereof.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image capture apparatus comprising:
   an image capture unit adapted to capture a digital image;
   a recording unit adapted to record the digital image captured by said image capture unit on a recording medium;
   a wireless communication unit adapted to transmit the digital image recorded on the recording medium to an external recording apparatus; and
   a control unit adapted to determine, using additional information corresponding to the digital image recorded on the recording medium, whether or not the digital image recorded on the recording medium is already transmitted to the external recording apparatus, the additional information being received from the external recording apparatus,
   wherein said control unit controls said wireless communication unit to transmit the digital image recorded on the recording medium to the external recording apparatus if said control unit determines that the digital image recorded on the recording medium is not already transmitted to the external recording apparatus, and
   wherein said control unit avoids transmitting the digital image recorded on the recording medium to the external recording apparatus if said control unit determines that the digital image recorded on the recording medium is already transmitted to the external recording apparatus.

2. An image capture apparatus comprising:
   an image capture unit adapted to capture a digital image;
   a recording unit adapted to record the digital image captured by said image capture unit on a recording medium;
   a wireless communication unit adapted to transmit the digital image recorded on the recording medium to an external recording apparatus; and
   a control unit adapted to determine, using additional information corresponding to the digital image recorded on the recording medium, whether or not the digital image recorded on the recording medium is already transmitted to the external recording apparatus, the additional information being received from the external recording apparatus,
   wherein said control unit control said wireless communication unit to transmit the digital image recorded on the recording medium to the external recording apparatus if said control unit determines that the digital image recorded on the recording medium is not already transmitted to the external recording apparatus, and
   wherein said control unit (a) avoids transmitting the digital image recorded on the recoding medium to the external recording apparatus and (b) determines, using the additional information, whether or not to delete the digital image recorded on the recording medium from the recording medium, if said control unit determines that the digital image recorded on the recording medium is already transmitted to the external recording apparatus.

3. The image capture apparatus according to claim 1, wherein the image capture apparatus is a camera integrated video recorder or a digital camera.

4. A method of controlling an image capture apparatus, the image capture apparatus including an image capture unit adapted to capture a digital image, a recording unit adapted to record the digital image captured by the image capture unit on a recording medium and a wireless communication unit adapted to transmit the digital image recorded on the recording medium to an external recording apparatus, said method comprising steps of:
   determining, using additional information corresponding to the digital image recorded on the recording medium, whether or not the digital image recorded on the recording medium is already transmitted to the external recording apparatus, the additional information being received from the external recording apparatus; and
   controlling the wireless communication unit to transmit the digital image recorded on the recording medium to the external recording apparatus if it is determined in said determining step that the digital image recorded on the recording medium is not already transmitted to the external recording apparatus,
   wherein the digital image recorded on the recording medium is not transmitted to the external recording apparatus if it is determined in said determining step that the digital image recorded on the recording medium is already transmitted to the external recording apparatus.

5. A method of controlling an image capture apparatus, the image capture apparatus including an image capture unit adapted to capture a digital image, a recording unit adapted to record the digital image captured by the image capture unit on a recording medium and a wireless communication unit adapted to transmit the digital image recorded on the recording medium to an external recording apparatus, said method comprising steps of:
   determining, using additional information corresponding to the digital image recorded on the recording medium, whether or not the digital image recorded on the recording medium is already transmitted to the external apparatus, the additional information being received from the external recording apparatus;
   controlling the wireless communication unit to transmit the digital image recorded on the recording medium to the external recording apparatus if it is determined in the determining step that the digital image recorded on the recording medium is not already transmitted to the external recording apparatus; and
   determining, using the additional information, whether or not to delete the digital image recorded on the recording medium from the recording medium, if it is determined in said determining step that the digital image recorded on the recording medium is already transmitted to the external recording apparatus, wherein the digital image recorded on the recording medium is not transmitted to the external recording apparatus if it is determined in said determining step that the digital image recorded on the recording medium is already transmitted to the external recording apparatus.

6. The image capture apparatus according to claim 2, wherein the image capture apparatus is a camera integrated video recorder or a digital camera.

7. The method according to claim 4, wherein the image capture apparatus is a camera integrated video recorder or a digital camera.

8. The method according to claim 5, wherein the image capture apparatus is a camera integrated video recorder or a digital camera.

9. The image capture apparatus according to claim 1, wherein said control unit determines, using the additional information, whether or not to skip a reproduction of the digital image recorded on the recording medium.

10. The image capture apparatus according to claim 2, wherein said control unit determines, using the additional information, whether or not to skip a reproduction of the digital image recorded on the recording medium.

11. The method according to claim 4, further comprising a step of determining, using the additional information, whether or not to skip a reproduction of the digital image recorded on the recording medium.

12. The method according to claim 5, further comprising a step of determining, using the additional information, whether or not to skip a reproduction of the digital image recorded on the recording medium.

* * * * *

UNITED STATES PATENT AND TRADEMARK OFFICE
CERTIFICATE OF CORRECTION

PATENT NO. : 7,394,966 B1
APPLICATION NO. : 09/479653
DATED : July 1, 2008
INVENTOR(S) : Wada et al.

It is certified that error appears in the above-identified patent and that said Letters Patent is hereby corrected as shown below:

<u>COLUMN 6</u>

Line 60, "communicate" should read --communicate with--.

<u>COLUMN 13</u>

Line 19, "communicate" should read --communicate with--.

<u>COLUMN 18</u>

Line 1, "unit control" should read --unit controls--.
Line 8, "recoding" should read --recording--.

Signed and Sealed this

Second Day of December, 2008

JON W. DUDAS
*Director of the United States Patent and Trademark Office*